Patented Mar. 27, 1934

1,952,911

UNITED STATES PATENT OFFICE 1,952,911

PROCESS FOR THE ACTIVATION OF CATALYSTS

Frank Joseph De Rewal, Camillus, N. Y., assignor to Atmospheric Nitrogen Corporation, New York, N. Y., a corporation of New York No Drawing. Application November 13, 1930 Serial No. 495,425

16 Claims. (Cl. 23—238)

This invention relates to a process for activating catalysts. More particularly, this invention relates to a process for activating cobalt oxide catalysts which have deteriorated during use in the oxidation of ammonia to nitrogen oxides by means of oxygen.

It has been found that pure cobalt oxide is an active and an efficient catalyst for the oxidation of ammonia, for example in admixture with air. The catalyst is used in the form of granules of a substantially uniform size. The ammonia-air mixture passed into contact with the catalyst should be highly purified in order to remove any materials which may exercise a deleterious effect upon the activity of the catalyst. In commercial operations, however, it has been found difficult to obtain an absolute purity of the ammonia-air mixture from catalyst poisons and accordingly it frequently happens that during use, a cobalt oxide catalyst will slowly deteriorate in its activity until it no longer is an efficient catalyst for the reaction.

It is an object of this invention to provide a process for the treatment of cobalt oxide catalysts whereby the catalyst is activated and when employed for the oxidation of ammonia is an active, efficient catalytic agent. It is an object of this invention to provide a process for the activation of granular cobalt oxide catalysts which does not cause an excessive disintegration of the granular structure of the catalyst material. Further, this invention has as an object the provision of a process for the reactivation of deteriorated cobalt oxide catalysts whereby the activity of the catalyst is restored. Other objects of the invention will in part be obvious and will in part appear hereinafter.

I have discovered that cobalt oxide may be activated by digesting it with an acid solvent for cobalt oxide under conditions as to strength of acid, temperature, and time of treatment such that a part only of the cobalt oxide is dissolved. I have further discovered that a granular cobalt oxide exhibits an unexpected resistance to disintegration by the acid treatment and that a large proportion of the material may be recovered as an activated usable granular material. Finally, I have discovered that the activity of the cobalt oxide which has been treated with an acid solvent for cobalt oxide may be enhanced by moistening the treated material with nitric acid and igniting the moistened material.

The invention comprises the treatment of cobalt oxide catalyst with an acid solvent for cobalt oxide, followed by a washing with water to remove the soluble products. The washed catalyst is preferably then treated with nitric acid and dried and heated to decompose the cobalt nitrate formed. The invention accordingly comprises the several steps and the relation of one or more of such steps with respect to each of the others thereof, which will be exemplified in the process hereinafter disclosed and the scope of the invention will be indicated in the claims.

For a fuller understanding of the nature and objects of the invention reference should be had to the following detailed description of a process for the reactivation of a deteriorated catalyst in accordance with the invention.

A granular cobalt oxide which has been employed for the oxidation of ammonia and its catalytic activity has decreased until it no longer is an efficient catalyst for the reaction, is removed from the catalyst vessel and screened to separate out particles of undesirable fineness. The screened granular material is placed in a suitable vessel which is not attacked by the acid employed for treating the material therein and will not contaminate the catalyst. A porcelain vessel has been found suitable. Sufficient dilute hydrochloric acid is added to cover the material. Acid of a concentration ranging from 2% to 37% HCl has been found satisfactory. It is preferred, however, to treat the material with a 5% hydrochloric acid solution. The mixture of acid and catalyst is heated preferably to a temperature of 85° to 90° C. for about forty-five minutes. With stronger acids, in general, the time of treating is decreased. Lower or higher temperatures than those noted as being preferred may be employed in which case the length of time of treatment may vary to provide for adequate digestion of the cobalt oxide particles. The acid, after this heating, is removed from the undissolved granular material and the material is thoroughly washed with water, preferably by decantation, to prevent excessive breaking up of the granules.

It has been found that if the cobalt oxide catalyst is digested with hydrochloric acid and washed with water, as described, and the recovered undissolved material is dried, it may be employed as a contact material to catalyze the ammonia oxidation reaction and that it will exhibit a markedly greater catalytic activity than the catalyst before such treatment with hydrochloric acid. I have found, however, that even greater activity may be imparted to the catalyst by treating the washed material from the hydrochloric acid digestion step with nitric acid.

Accordingly, it has been found preferable, after removing the last wash-water to treat the material with sufficient nitric acid to thoroughly wet it. About three-fourths of a pound of 38° Bé. nitric acid for every pound of the granular material (dry weight) has been found satisfactory. After heating to remove the nitric acid, the catalyst is dried and then ignited at a temperature of, for example, 300° to 450° C. to remove any free hydrochloric acid and nitric acid which may remain, and convert any cobalt nitrate formed to cobalt oxide. After cooling, the catalyst is screened and the granules of the desired size can then be employed as a catalyst for the oxidation of ammonia. It has been found, for example, that by treating deteriorated catalysts by the method above described, the oxidation efficiency of the catalyst may be increased as much as by 8%. The method described may be employed for the repeated reactivation of the same catalyst.

Since certain changes may be made in carrying out the above process without departing from the scope of the invention, it is intended that all matter pertaining to the above description shall be interpreted as illustrative and not in a limiting sense. For example, sulfuric acid or acetic acid of proper concentration may be employed in place of the hydrochloric acid for the digestion of the catalyst. In general, an acid solvent for cobalt oxide which does not exercise a poisoning effect upon the catalyst is suitable for the digestion treatment. It has been found that the utility of my invention is not limited to the reactivation of deteriorated catalyst, but that in many cases new catalyst before use for catalyzing the oxidation of ammonia may be beneficially treated by the process above described.

I claim:

1. The process of activating a cobalt oxide catalyst which comprises digesting said catalyst with hydrochloric acid, discontinuing the digestion while catalyst material remains undissolved and converting the undissolved material into an active cobalt oxide catalyst.

2. The process of activating a cobalt oxide catalyst which comprises digesting said catalyst with an acid solvent for cobalt oxide, discontinuing the digestion while cobalt oxide remains undissolved and converting the undissolved cobalt oxide into an active cobalt oxide.

3. The process of activating a cobalt oxide catalyst which comprises digesting said catalyst with an acid solvent for cobalt oxide, discontinuing the digestion while cobalt oxide remains undissolved, washing the thus treated catalyst, moistening the washed material with nitric acid, and igniting the moistened material.

4. The process of activating a cobalt oxide catalyst which comprises digesting said catalyst with hydrochloric acid, discontinuing the digestion while catalyst material remains undissolved, washing the thus treated catalyst, moistening the washed material with nitric acid, and igniting the moistened material.

5. The process of activating a granular cobalt oxide catalyst which comprises digesting said granular catalyst with an acid solvent for cobalt oxide, discontinuing the digestion while catalyst material remains undissolved and converting the undissolved material into an active cobalt oxide catalyst.

6. The process of activating a granular cobalt oxide catalyst which comprises digesting said granular catalyst with hydrochloric acid, discontinuing the digestion while catalyst material remains undissolved and converting the undissolved material into an active cobalt oxide catalyst.

7. The process of activating a granular cobalt oxide catalyst which comprises digesting said granular catalyst with hydrochloric acid, discontinuing the digestion while catalyst granules remain undissolved, moistening the thus treated material with nitric acid and igniting the moistened material.

8. The process of reactivating a cobalt oxide catalyst which comprises digesting a cobalt oxide catalyst the catalytic activity of which has been decreased by use with an acid solvent for cobalt oxide, discontinuing the digestion while catalyst material remains undissolved and converting the undissolved material into an active cobalt oxide catalyst.

9. The process of reactivating a cobalt oxide catalyst which comprises digesting a cobalt oxide catalyst the catalytic activity of which has been decreased by use with hydrochloric acid, discontinuing the digestion while cobalt oxide remains undissolved and converting the undissolved cobalt oxide into an active cobalt oxide.

10. The process of reactivating a granular cobalt oxide catalyst which comprises digesting a granular cobalt oxide catalyst the catalytic activity of which has been decreased by use with a dilute hydrochloric acid, discontinuing the digestion while catalyst material remains undissolved and converting the undissolved material into an active cobalt oxide catalyst.

11. The process of reactivating a catalyst which comprises digesting a granular cobalt oxide catalyst the catalytic activity of which has been decreased by use for ammonia oxidation with dilute hydrochloric acid, discontinuing the digestion while catalyst granules remain undissolved moistening the thus treated material with nitric acid, and drying and igniting the moistened material.

12. The process of reactivating a catalyst which comprises digesting a granular cobalt oxide catalyst the catalytic activity of which has been decreased by use for ammonia oxidation with about 5% hydrochloric acid, discontinuing the digestion while catalyst granules remain undissolved and converting the undissolved cobalt oxide into an active cobalt oxide.

13. The process of reactivating a catalyst which comprises digesting a granular cobalt oxide catalyst the catalytic activity of which has been decreased by use for ammonia oxidation with about 5% hydrochloric acid, discontinuing the digestion while catalyst granules remain undissolved moistening the thus treated material with nitric acid, and igniting the moistened material.

14. The process of reactivating an ammonia oxidation catalyst consisting of granular cobalt oxide which comprises digesting said catalyst with about 5% hydrochloric acid solution at a temperature of about 85°–90° C., removing the hydrochloric acid solution from the digested material, wetting the material thus obtained with nitric acid, heating the wetted material to dry it, and then igniting the dried material at a temperature of about 300°–450° C.

15. The process of activating a cobalt oxide catalyst which comprises digesting said catalyst with about 2% to 37% hydrochloric acid, discontinuing the digestion while catalyst material remains undissolved and converting the undissolved material into an active cobalt oxide.

16. The process of reactivating a catalyst which comprises digesting a granular cobalt oxide catalyst the catalytic activity of which has been decreased by use for the oxidation of ammonia with about 2% to 37% hydrochloric acid, discontinuing the digestion while cobalt oxide material remains undissolved and converting the undissolved material into an active cobalt oxide.

FRANK JOSEPH DE REWAL.

CERTIFICATE OF CORRECTION.

Patent No. 1,952,911. March 27, 1934.

FRANK JOSEPH De REWAL.

It is hereby certified that error appears in the printed specification of the above numbered patent requiring correction as follows: Page 2, lines 39, 90, 114, 138 and 146, claims 2, 9, 12, 15 and 16, respectively, after the word "oxide" and before the period insert the word catalyst; and that the said Letters Patent should be read with these corrections therein that the same may conform to the record of the case in the Patent Office.

Signed and sealed this 15th day of May, A. D. 1934.

Bryan M. Battey (Seal) Acting Commissioner of Patents.